(12) United States Patent
Tseng

(10) Patent No.: US 9,230,346 B2
(45) Date of Patent: Jan. 5, 2016

(54) PROGRAMMABLE GAMMA CIRCUIT FOR GAMMA CORRECTION

(71) Applicant: HIMAX TECHNOLOGIES LIMITED, Tainan (TW)

(72) Inventor: Wei-Kai Tseng, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 108 days.

(21) Appl. No.: 14/284,385

(22) Filed: May 21, 2014

(65) Prior Publication Data
US 2015/0339834 A1 Nov. 26, 2015

(51) Int. Cl.
| | |
|---|---|
| G06T 11/00 | (2006.01) |
| G09G 5/02 | (2006.01) |
| G09G 3/36 | (2006.01) |
| H04N 5/202 | (2006.01) |
| H04N 1/60 | (2006.01) |
| H04N 17/00 | (2006.01) |

(52) U.S. Cl.
CPC .............. *G06T 11/001* (2013.01); *G09G 3/36* (2013.01); *G09G 2320/0626* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,359,389 B1* | 3/2002 | Medina | ................. | G09G 3/2011 315/169.1 |
| 6,836,232 B2* | 12/2004 | Bu | ....................... | G09G 3/3611 341/118 |
| 8,194,015 B1* | 6/2012 | Orlando | .............. | G09G 3/3648 345/87 |
| 2002/0158882 A1* | 10/2002 | Liaw | .................... | G09G 3/2011 345/589 |
| 2003/0132906 A1* | 7/2003 | Tanaka | ................. | G09G 3/2011 345/89 |
| 2005/0140628 A1* | 6/2005 | Oh | ........................ | G09G 3/3406 345/89 |
| 2008/0062110 A1* | 3/2008 | Chang | ................. | G09G 3/3696 345/100 |
| 2008/0062111 A1* | 3/2008 | Chang | ................. | G09G 3/3655 345/100 |
| 2008/0316163 A1* | 12/2008 | Van Den Homberg | ............. | G09G 3/3685 345/98 |
| 2009/0201231 A1* | 8/2009 | Takahara | ............. | G09G 3/3233 345/76 |
| 2010/0156944 A1* | 6/2010 | Haupt | .................. | G09G 3/3688 345/690 |

FOREIGN PATENT DOCUMENTS

| | | |
|---|---|---|
| CN | 101826308 A | 9/2010 |
| TW | 200635188 A | 10/2006 |
| TW | 201028815 A | 8/2010 |
| TW | 201102995 A | 1/2011 |
| TW | 201112637 A | 4/2011 |
| TW | 201129963 A | 9/2011 |

* cited by examiner

*Primary Examiner* — Wesner Sajous
(74) *Attorney, Agent, or Firm* — CKC & Partners Co., Ltd.

(57) ABSTRACT

A programmable gamma circuit for gamma correction is disclosed. The programmable gamma circuit includes a string digital-to-analog converter, a first operational amplifier, and an output resistor string. The string digital-to-analog converter selects an analog voltage from a plurality of candidate voltages according to a digital reference code. An output terminal of the first operational amplifier outputs a first output voltage. A positive input terminal of the first operational amplifier is electrically connected to the string digital-to-analog converter for receiving the analog voltage. The output resistor string is divided into a first resistor part and a second resistor part by a connection terminal which is electrically connected to a negative input terminal of the first operational amplifier, and a resistance of the first resistor part is a multiple of a resistance of the second resistor part.

15 Claims, 4 Drawing Sheets

PROGRAMMABLE GAMMA CIRCUIT FOR GAMMA CORRECTION

BACKGROUND

1. Field of Invention

The present invention relates to a gamma calibrating circuit of a display. More particularly, the present invention relates to a programmable gamma calibrating circuit of a display.

2. Description of Related Art

Human eyes are more sensitive to variations in brightness in a dark environment which indicates that the brightness sensitivity of human eyes is non-linear. Therefore, a correction process, i.e., gamma correction, for correcting the brightness of an image displayed on a display is required so that the brightness is in accordance with the brightness found in the natural environment. A programmable gamma circuit is typically arranged in an LCD display device to generate gamma calibration signals for use in image gamma calibration, and the brightness correction process is implemented through a digital-to-analog converter which converts digital codes to analog voltages.

In general, digital-to-analog converters convert digital image signals into analog voltages having corresponding gamma characteristics. The bit width of these digital-to-analog converters is increased to obtain a desired gamma characteristic, and such increasing in the bit width of digital-to-analog converters causes an increase in the circuit area of the same. Particularly, in a high voltage process, resistor strings of the digital-to-analog converters require a large circuit area, and the circuit size as well as the production cost of the digital-to-analog converters are raised as a result.

SUMMARY

According to one embodiment of the present invention, a programmable gamma circuit which generates a gamma reference voltage or a gamma voltage related to gamma correction is disclosed. The programmable gamma circuit includes a string digital-to-analog converter, a first operational amplifier, and an output resistor string. The string digital-to-analog converter selects an analog voltage from a plurality of candidate voltages according to a digital reference code. An output terminal of the first operational amplifier outputs a first output voltage. A positive input terminal of the first operational amplifier is electrically connected to the string digital-to-analog converter for receiving the analog voltage. The output resistor string is divided into a first resistor part and a second resistor part by a connection terminal which is electrically connected to a negative input terminal of the first operational amplifier, and a resistance of the first resistor part is a multiple of a resistance of the second resistor part.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
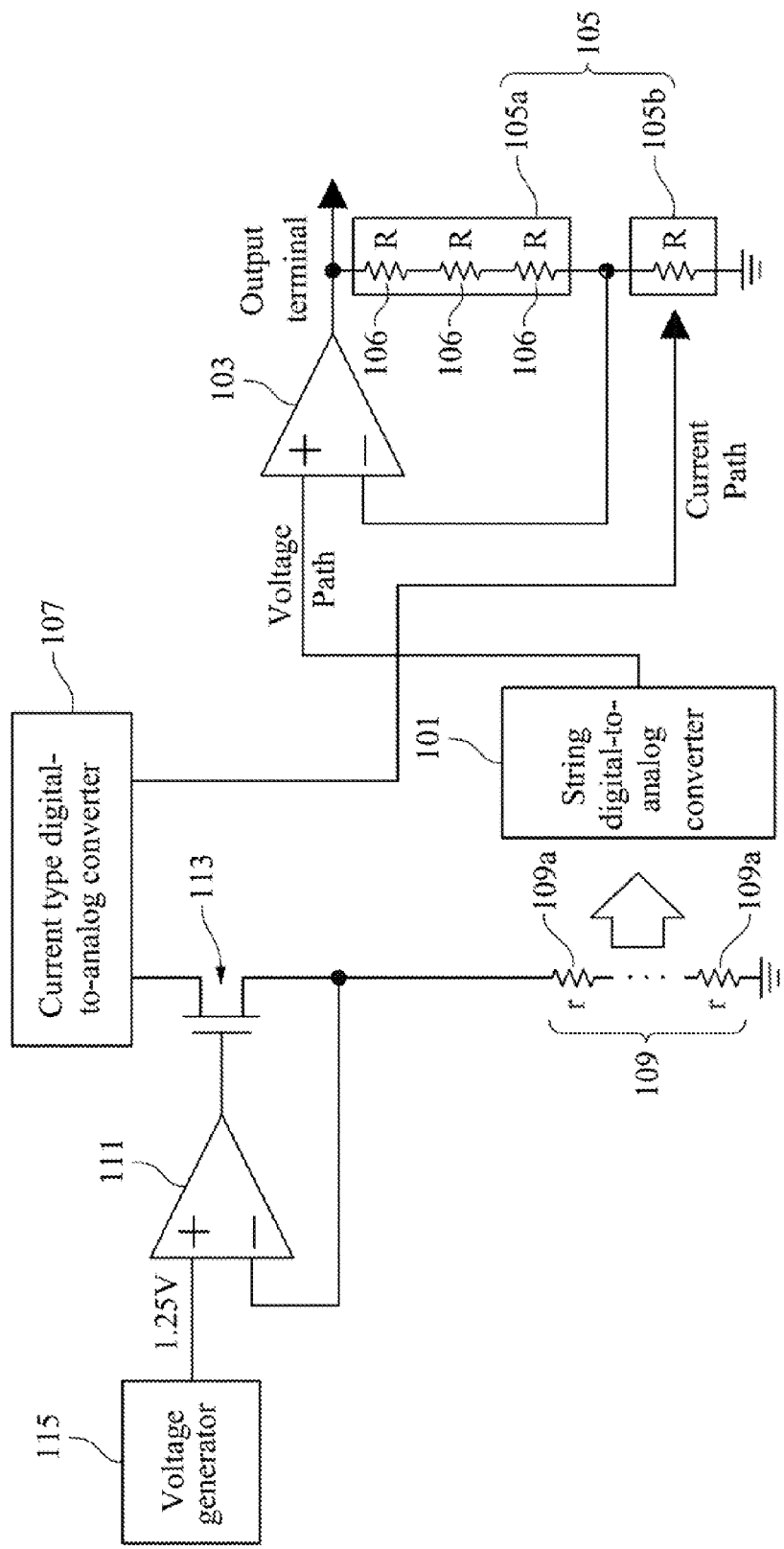
FIG. 1A is a circuit diagram of a programmable gamma circuit according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

Alternative language and synonyms may be used in the specification for any one or more of the terms discussed herein, nor is any special significance to be placed upon whether or not a term is elaborated or discussed herein. A recital of one or more synonyms does not exclude the use of other synonyms. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

When an element is referred to as being "on" another element, it can be directly on the other element or intervening elements may be present therebetween. In contrast, when an element is referred to as being "directly on" another element, there are no intervening elements present. Although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

When an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A programmable gamma circuit of the following embodiments utilizes a voltage path and a current path to implement the superposition theorem, such that the output voltages respectfully generated by the voltage path and the current path can be combined to derive a sum. In addition, the area of a resistor string for a digital-to-analog converter can be reduced, and the equivalent output impedance of the digital-to-analog converter is also reduced.

Furthermore, the programmable gamma circuit can be employed to generate both gamma reference voltages and gamma voltages for driving the pixels of a display panel, and therefore, the same circuit structure can be repeatedly used. Thus, array circuits can be utilized to realize the programmable gamma circuit which simplifies the circuit design procedure.

As is well known, a driving voltage Vdrive for driving the pixels on a display panel is formed by two parts, namely, a Gamma reference part (Vref) and a Gamma voltage part. The driving voltage Vdrive is represented as follows:

$$Vdrive = Vref \times \frac{GMA - \text{code}}{1024} = \left(1.25 \times 4 \times \frac{Rference - \text{code}}{1024}\right) \times \left(4 \frac{GMA - \text{code}}{1024}\right).$$

The programmable gamma circuit of the following embodiment is used to implement the above driving voltage Vdrive.

FIG. 1A is a circuit diagram of a programmable gamma circuit according to one embodiment of the present invention. As stated above, the programmable gamma circuit can be repeatedly used to produce both gamma reference voltages and gamma voltages. In FIG. 1A, a gamma reference voltage is generated as an example.

In the programmable gamma circuit shown in FIG. 1A, both a voltage path and a current path are combined to produce a gamma reference voltage Vref on an output terminal. As shown in FIG. 1A, the programmable gamma circuit includes a string digital-to-analog converter 101, a first operational amplifier 103, an output resistor string 105, a current-type digital-to-analog converter 107, a transistor 113, a second operational amplifier 111, and a voltage generator 115. The programmable gamma circuit further includes a voltage divider string 109 which in turn includes a plurality of divider resistors 109a that divide a base voltage to provide candidate voltages for the string digital-to-analog converter 101.

Figure 1B:
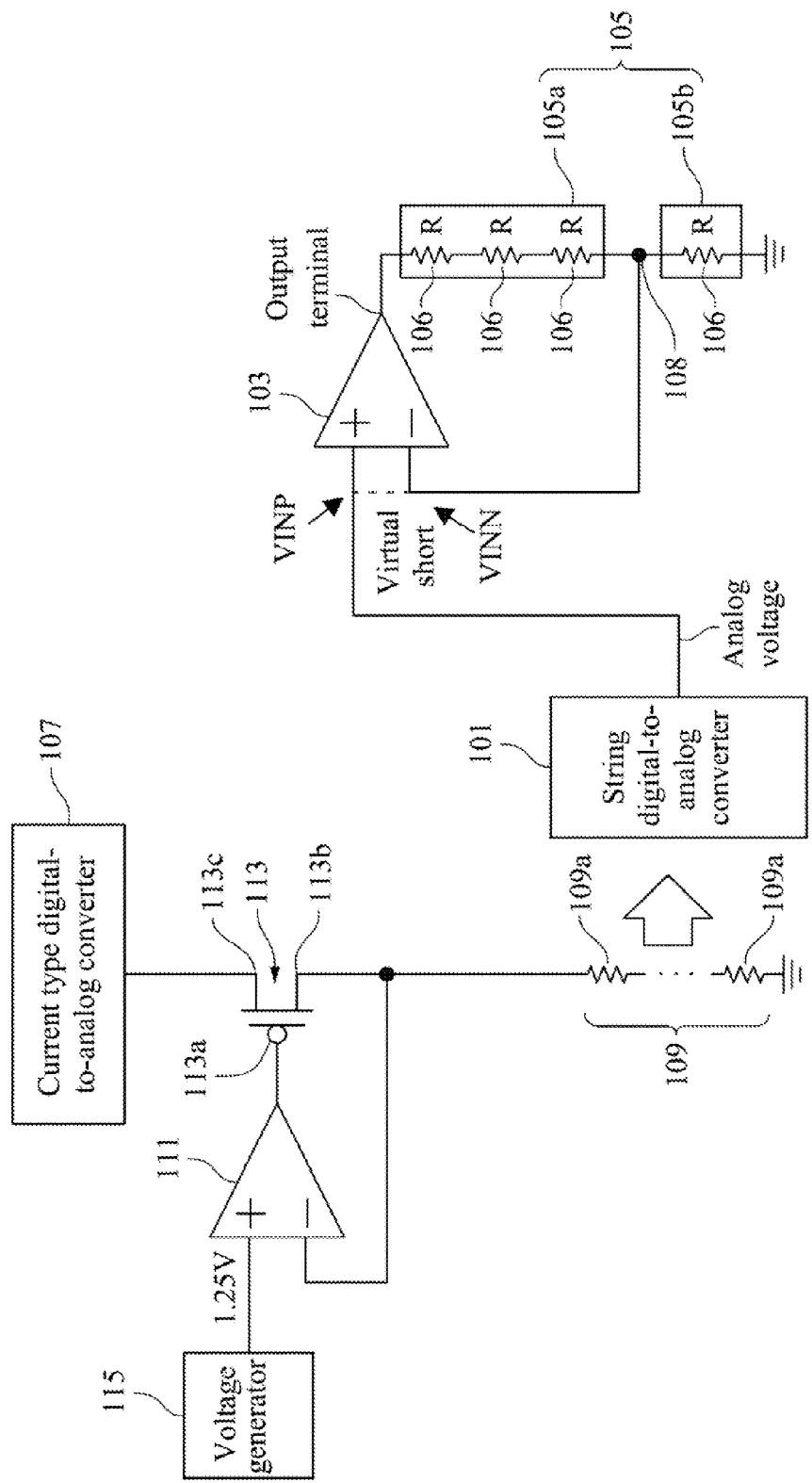
FIG. 1B is a voltage path of the programmable gamma circuit of FIG. 1A according to one embodiment of the present invention.

FIG. 1B shows a voltage path of the programmable gamma circuit of FIG. 1A according to one embodiment of the present invention. The first operational amplifier 103 includes an output terminal, a positive input terminal (+), and a negative input terminal (−). The positive input terminal (+) of the first operational amplifier 103 is electrically connected to the string digital-to-analog converter 101 for receiving an analog voltage, the negative input terminal (−) is electrically connected to an connection terminal 108 of the output resistor string 105, and the output terminal outputs a first output voltage Vout1.

The output resistor string 105 is divided into a first resistor part 105a and a second resistor part 105b by the connection terminal 108 which is electrically connected to the negative input terminal (−) of the first operational amplifier 103, and a virtual short effect between the positive input terminal (+) and the negative input terminal (−) of the first operational amplifier 103 exists.

A resistance of the first resistor part 105a is a multiple of a resistance of the second resistor part 105b. For example, the resistance of the first resistor part 105a can be three times the resistance of the second resistor part 105b. In this case, the first resistor part 105a can be composed of three of a first kind resistor 106 while the second resistor part 105b can be composed of one of the first kind resistor 106. With such a resistor configuration, the voltage appearing on the output terminal of the first operational amplifier 103 will be four times the voltage on the positive input terminal (+) of the first operational amplifier 103.

The voltage divider string 109 includes a plurality of divider resistors 109a which divide a base voltage appearing on the negative input terminal (−) of the second operational amplifier 111 to provide a plurality of candidate voltages for the string digital-to-analog converter 101. As an example, there can be 64 divider resistors 109a serially connected. Therefore, these candidate voltages can be ¹⁄₆₄, ²⁄₆₄ . . . , ⁶³⁄₆₄, 1 of the base voltage. The string digital-to-analog converter 101 selects an analog voltage from the candidate voltages according to a digital reference code $N_{MSB}$. In detail, the string digital-to-analog converter 101 can be a 6-bit converter and selects one of the candidate voltages appearing on the terminals of the divider resistors 109a.

In addition, as described above, the second operational amplifier 111 as well as the voltage generator 115 are also included in the programmable gamma circuit. The second operational amplifier 111 has a positive input terminal (+) for receiving a source voltage 1.25V generated by the voltage generator 115. Due to the virtual short effect of operational amplifiers, the source voltage on the positive input terminal (+) of the second operational amplifier 111 will also appear on the negative input terminal (−) of the second operational amplifier 111. Since the negative input terminal (−) of the second operational amplifier 111 is electrically connected to an end terminal of the voltage divider string 109, the source voltage will be the base voltage divided by the voltage divider string 109.

Furthermore, a gate terminal of the transistor 113 is electrically connected to the output terminal of the second operational amplifier 111, and a first source drain terminal 113b of the transistor 113 is electrically connected to the end terminal of the voltage divider string 109. With such a circuit configuration, the first output voltage Vout1 outputted from the output terminal of the first operational amplifier 103 may be represented as follows:

$$Vout1 = K1 \times \frac{N_{MSB} + 1}{64},$$

where K1 is a constant equal to 1.25×4, and $N_{MSB}$ is a digital reference code less than 64.

Figure 1C:
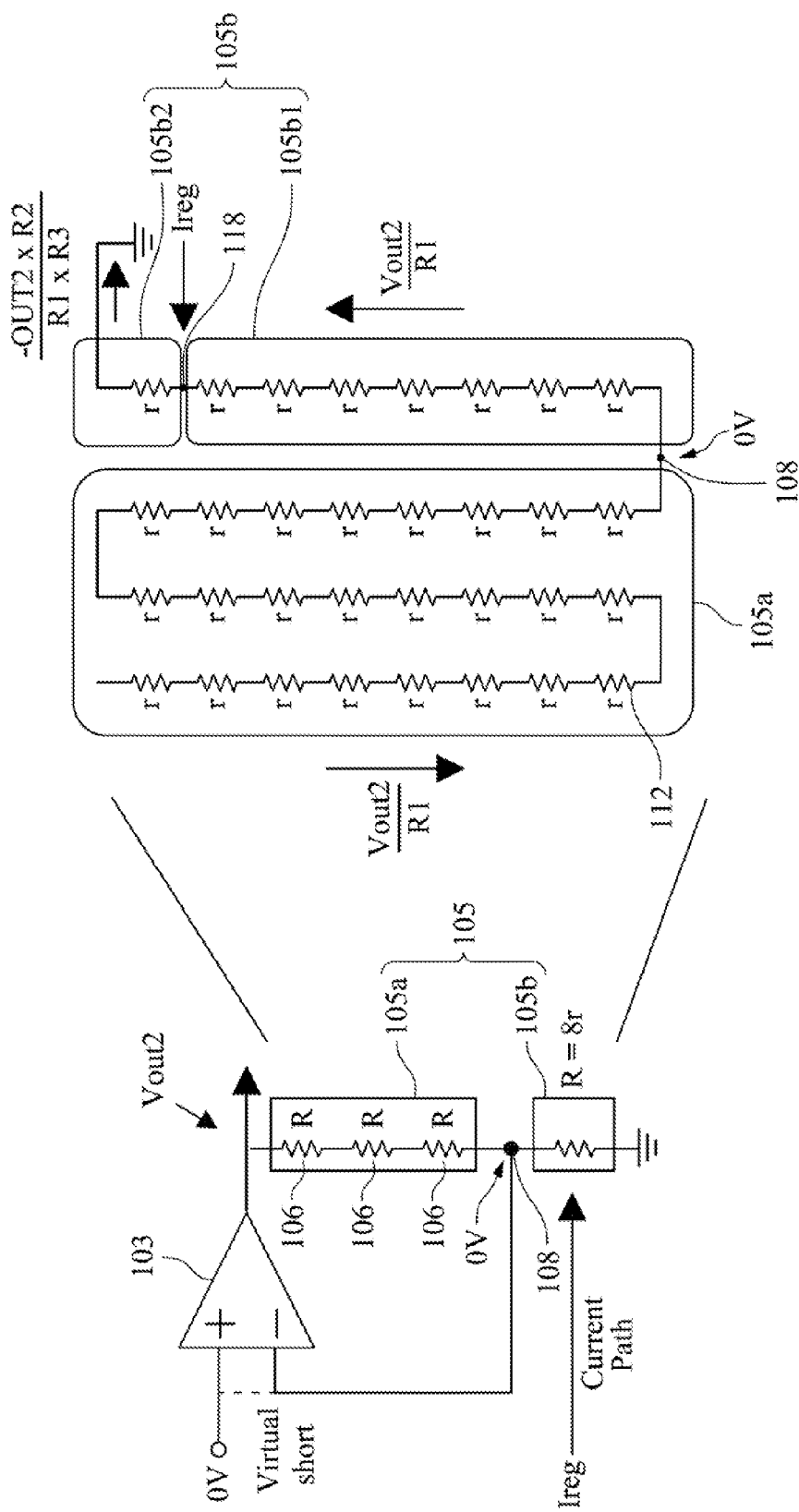
FIG. 1C is a current path of the programmable gamma circuit of FIG. 1A according to one embodiment of the present invention.

FIG. 1C is a current path of the programmable gamma circuit of FIG. 1A according to one embodiment of the present invention. In fact, FIG. 1C is a partial circuit diagram of the programmable gamma circuit of FIG. 1A, illustrating a current path of the programmable gamma circuit and an output resistor string of the programmable gamma circuit in greater detail. The current path of the programmable gamma circuit contributes to the second output voltage Vout2 on the output terminal of the first operational amplifier 103. As shown in FIG. 1C, the second resistor part 105b is further divided into a second resistor region 105b1 and a third resistor region 105b2 by a current input terminal 118, in which the resistance of the first kind resistor 106 is eight times a resistance of a second kind resistor 112, and a resistance ratio of the first resistor part 105a, the second resistor region 105b1, and the third resistor region 105b2 is 24:7:1.

The current-type digital-to-analog converter 107 shown in FIG. 1A provides a regulating current keg to the current input terminal 118, and it can be a 4-bit converter in this embodiment. Since the positive input terminal (+) as well as the connection terminal 108 are virtually short to ground voltage 0V, according to the circuit node theorem, the regulating current Ireg provided by the current-type digital-to-analog converter 107 should be as follows:

$$Ireg = \frac{1.25}{64r} \times \frac{N_{LSB} + 1}{12},$$

where r is the resistance of the third resistor region 105b2, and $N_{LSB}$ is a digital gamma code.

As a result, the second output voltage Vout2 on the output terminal of the first operational amplifier 103 contributed by the regulating current Ireg is equal to the following:

$$Vout2 = -K2 \times \frac{N_{LSB}+1}{64 \times 16},$$

where K2 is a constant equal to 1.25×4, and $N_{LSB}$ is the digital gamma code.

According to the superposition theorem, a gamma reference voltage Vref outputted on the output terminal of the first operational amplifier 103 is produced by combining the first output voltage Vout1 and the second output voltage Vout2, and the gamma reference voltage Vref is represented as follows:

$$Vref = Vout1 + Vout2 = K3 \times \frac{16 \times (N_{MSB}+1) - (N_{LSB}+1)}{1024},$$

where K3 is a constant equal to 1.25×4.

Similarly, the gamma voltage can also be produced through the same circuit structure, and the driving voltage Vdrive for driving the pixels on the display panel can be derived by combining the gamma reference voltage and the gamma voltage.

Figure 1D:
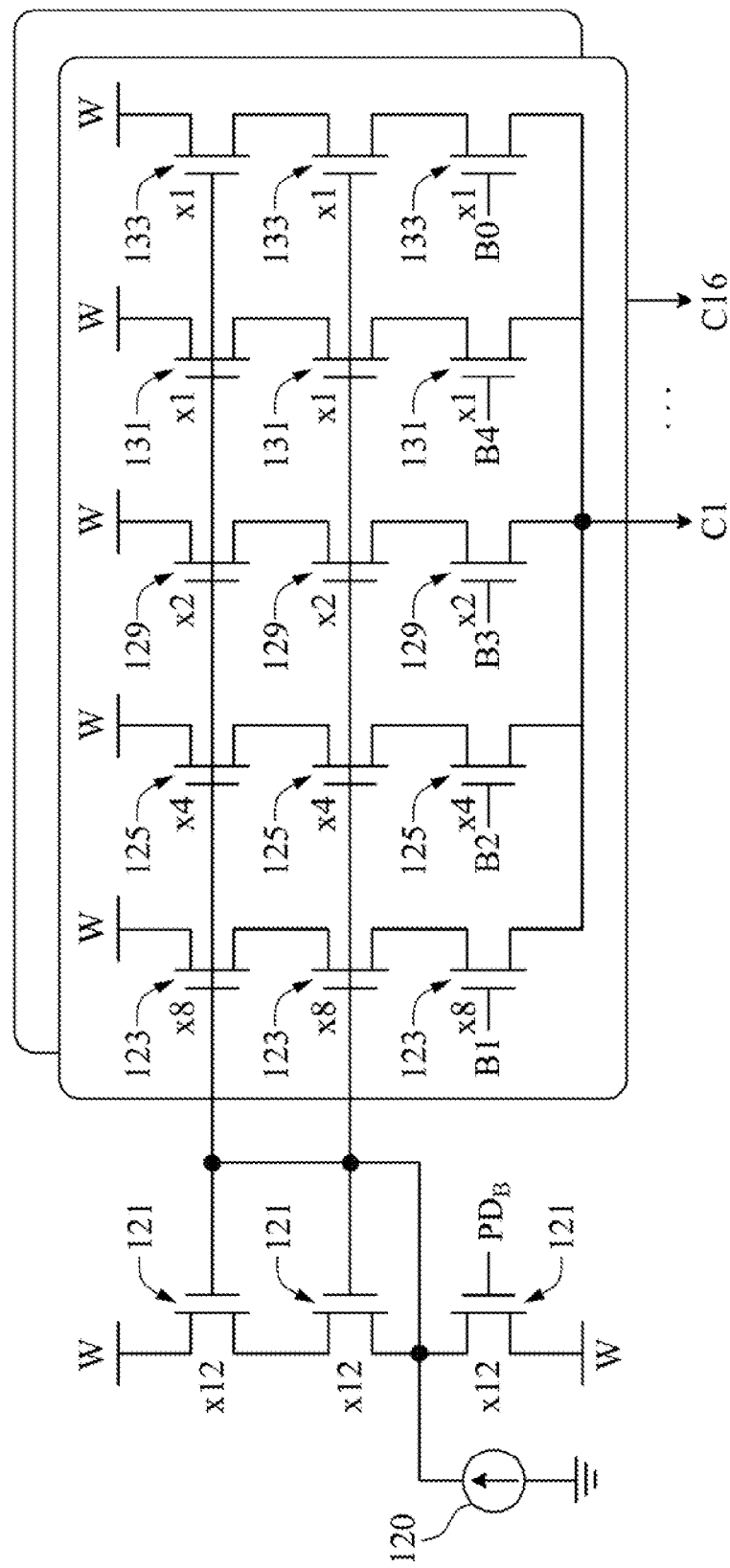
FIG. 1D is a circuit diagram of a current-type digital-to-analog converter according to one embodiment of the present invention.

FIG. 1D is a circuit diagram of a current type digital-to-analog converter according to one embodiment of the present invention. The current type digital-to-analog converter 107 is basically constructed based on a current mirror structure. The current type digital-to-analog converter 107 substantially includes several first resistors 133, several second resistors 131, several third resistor 129 several fourth resistor 125, several fifth resistors 123, and several sixth resistors 121. Transistor size ratio and a corresponding current volume ratio of the first resistor 133, the second resistor 131, the third resistor 129, the fourth resistor 125, the fifth resistor 123, and the sixth resistor are 1:1:2:4:8:12.

The current source 120 comes from a second drain source terminal 113c of the transistor 113. If the digital gamma code entering the input terminal B0 to B4 is equal to 2'b 00001, a current flowing through the node C1 is equal to one-twelfth of the current source 120.

The programmable gamma circuit of the above embodiment repeatedly utilizes the same circuit structure to generate both the gamma reference voltages and the gamma voltages for driving the pixels of the display panel. Therefore, array circuits can be used to realize the programmable gamma circuit which simples the circuit design procedure. In addition, the area of the resistor string for the digital-to-analog converter can be reduced due to the fact that the separated voltage path and current path come from two individual converters, and the equivalent output impedance of the digital-to-analog converter is also reduced.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A programmable gamma circuit which generates a gamma reference voltage or a gamma voltage related to gamma correction, the programmable gamma circuit comprising:
    a string digital-to-analog converter for selecting an analog voltage from a plurality of candidate voltages according to a digital reference code;
    a first operational amplifier comprising:
        an output terminal for outputting a first output voltage; and
        a positive input terminal electrically connected to the string digital-to-analog converter for receiving the analog voltage; and
    an output resistor string divided into a first resistor part and a second resistor part by a connection terminal which is electrically connected to a negative input terminal of the first operational amplifier, wherein a resistance of the first resistor part is a multiple of a resistance of the second resistor part.

2. The programmable gamma circuit of claim 1, wherein the resistance of the first resistor part is three times the resistance of the second resistor part.

3. The programmable gamma circuit of claim 1, wherein the string digital-to-analog converter is 6 bits.

4. The programmable gamma circuit of claim 3, further comprising:
    a voltage divider string comprising a plurality of divider resistors which divides a base voltage to provide the candidate voltages for the string digital-to-analog converter.

5. The programmable gamma circuit of claim 4, wherein there are 64 divider resistors serially connected.

6. The programmable gamma circuit of claim 5, further comprising:
    a second operational amplifier having a positive terminal for receiving a source voltage that is identical to the base voltage and having a negative input terminal electrically connected to an end terminal of the voltage divider string; and
    a transistor comprising:
        a gate terminal electrically connected to an output terminal of the second operational amplifier; and
        a first source drain terminal electrically connected to the end terminal of the voltage divider string.

7. The programmable gamma circuit of claim 6, wherein the first output voltage Vout1 outputted from the output terminal of the first operational amplifier is represented as follows:

$$Vout1 = K1 \times \frac{N_{MSB}+1}{64},$$

where K1 is a constant and $N_{MSB}$ is the digital reference code less than 64.

8. The programmable gamma circuit of claim 7, wherein the K1 is equal to 1.25×4.

9. The programmable gamma circuit of claim 7, wherein the second resistor part is further divided into a second resistor region and a third resistor region by a current input terminal, and a resistance ratio of the first resistor part, the second resistor region, and the third resistor region is 24:7:1.

10. The programmable gamma circuit of claim 9, further comprising:
a current-type digital-to-analog converter for providing a regulating current to the current input terminal.

11. The programmable gamma circuit of claim 10, wherein the regulating current Ireg provided by the current-type digital-to-analog converter is represented as follows:

$$Ireg = \frac{1.25}{64r} \times \frac{N_{LSB} + 1}{12},$$

where r is identical to a resistance of the third resistor region, and $N_{LSB}$ is a digital gamma code.

12. The programmable gamma circuit of claim 11, wherein the regulating current Ireg contributes a second output voltage on the output terminal of the first operational amplifier, and the second output voltage Vout2 is represented as follows:

$$Vout2 = -K2 \times \frac{N_{LSB} + 1}{64 \times 16},$$

where K2 is a constant and $N_{LSB}$ is the digital gamma code.

13. The programmable gamma circuit of claim 12, wherein K2 is equal to 1.25×4.

14. The programmable gamma circuit of claim 12, wherein a gamma reference voltage Vref outputted on the output terminal of the first operational amplifier is represented as follows:

$$Vref = Vout1 + Vout2 = K3 \times \frac{16 \times (N_{MSB} + 1) - (N_{LSB} + 1)}{1024},$$

where K3 is a constant.

15. The programmable gamma circuit of claim 14, wherein K3 is equal to 1.25×4.

* * * * *